June 28, 1927. 1,633,858
H. T. GROVES ET AL
APPARATUS FOR SEPARATING FLUIDS
Filed Jan. 2. 1925 4 Sheets-Sheet 4

INVENTORS
Howard T. Groves &
Joseph W. Cushman
BY
ATTORNEY

Patented June 28, 1927.

1,633,858

UNITED STATES PATENT OFFICE.

HOWARD T. GROVES AND JOSEPH W. CUSHMAN, OF PARSONS, KANSAS, ASSIGNORS TO G & C. OIL SEPARATOR CORPORATION, OF PARSONS, KANSAS, A CORPORATION OF KANSAS.

APPARATUS FOR SEPARATING FLUIDS.

Application filed January 2, 1925. Serial No. 73.

This invention relates to an oil separator for segregating oil from water and basic settlings as the fluid comes from the oil well and the primary object is to provide a device which will be entirely automatic in its operation, causing the oil to flow off through an oil off-take, the water to pass away through a water off-take and the basic settlings to be discharged through a separate outlet, the basic settlings being passed out intermittently. The device is so constructed that the water in the fluid treated may be used to actuate a valve operating motor so that upon the accumulation of water in the motor certain valves in the mechanism will be caused to unseat and by no means an unimportant feature of our invention is a fluid flow regulator or governor which will control the volume of rate of flow of the fluid into the apparatus.

When fluid is pumped from an oil well it not infrequently contains oil, water and precipitates or solids, commonly known as basic settlings, and inasmuch as the oil must be free of the extraneous matter, such as water and basic settlings, the importance of our invention will be apparent because with it oil may be delivered to the pipe line or tank without the inclusion of the objectionable matter.

The novelty of the invention will be clearly understood by reference to the following description in connection with the accompanying drawings, in which Fig. 1 is a side elevational view of an oil separating apparatus constructed in accordance with our invention, the water accumulating tank of the valve operating mechanism being shown partly in section.

Figure 1:
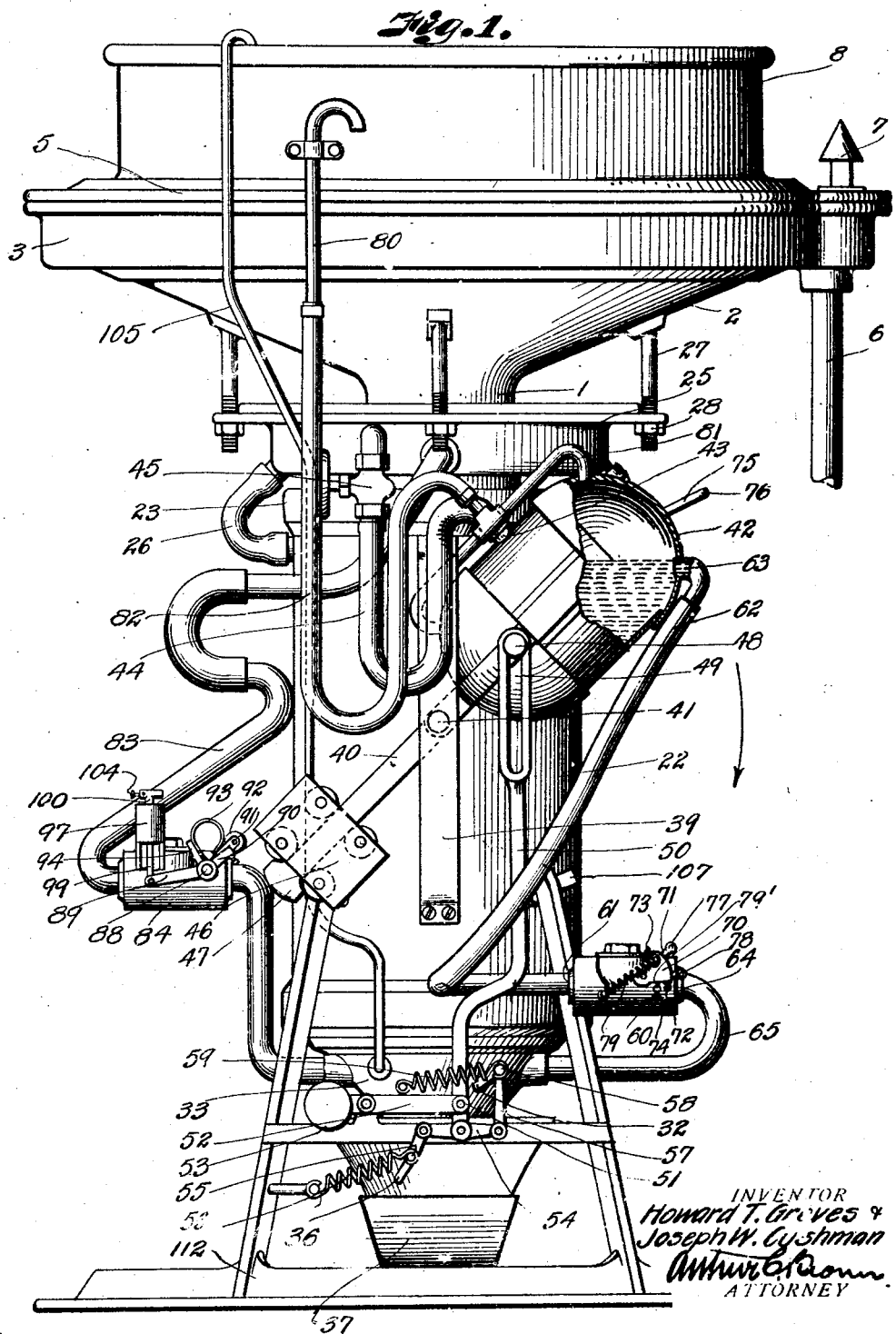

Referring now to the drawings by numerals of reference, 1 designates a water cylinder or passageway having at its upper end an outwardly flared hopper or oil accumulating chamber 2, surrounded by a ring shaped overflow trough or chamber 3 the upper edge 4 of the hopper terminating short of the cover 5 of the trough 3 so that oil may flow over the edge 4 into the trough 3 and be discharged through the off-take or over-flow pipe 6. The cover 5 carries a vent 7 open to atmosphere to vent the trough 3. Superposed upon the cover 5 is a receptacle or tank 8 into which the fluid (and by fluid we mean the water, oil and basic settlings) being delivered into the chamber 2 through an inlet tube or pipe 9 shown in detail in Figure 4. The pipe 9 has a constricted threaded nipple 10 which screws into the cover 5 and the larger portion 11 carries a threaded collar 12 which is adjustable on the threaded portion 11 and which may be held in adjustable position by a jam nut 13. The collar 12 constitutes the hub of a spider which is provided with radially disposed arms 14 on the outer ends of which are links 15 connected to the blades 16 of a governor wheel consisting of the blades 16 integral with the imperforate valve disk 17 which is normally in spaced relation and below the edge 18 of the flared inlet nozzle 19 which communicates with the pipe 9 through which the fluid flows from the receptacle into the chamber 2. The adjustment of the collar 12 will cause the valve disk 17 to approach or recede from the valve seat 18 so that the volume of fluid passing through the pipe 9 during a given time may be controlled, that is, if the valve disk 17 lies relatively close to the seat 18 the incoming fluid will tend to seat the valve under less velocity than when the disk 17 is more distant from the edge 18. This is due to the fact that the fluid passing through the conical nozzle 19 will, upon striking the disk 17, be deflected radially to act against the blades 16, causing the blades and the disk connecting them to slightly move about the axis of the pipe 9 and during the movement of the disk and the blades the links 15 will be swung from vertical position to oblique position shortening the distance between the blades and the arms 14 so that the disk 17 will move toward the seat 18. Of course when the disk is initially nearer the seat 18 less movement of the blades about the axis of the pipe 9 will be required to valve the nozzle 19 than when the distance is relatively great. This will be clearly apparent by referring to Figures 3 and 4. It will be seen then that the rate of flow or the volume passing into chamber 2 during a given period will be regulated by the regulator or governor shown in Figure 4. As the fluid is received in the chamber 2 the water and basic settlings will gravitate to the bottom of the cylinder 1. The bottom of the cylinder 1 is open and it communicates with a separation chamber 20 formed by an upstanding cylindrical wall 21 which surrounds the cylinder 1 in spaced relation and which terminates below the top of the casing 22 which is of greater diameter than the cylinder 1 and which is fastened to the exterior wall thereof below the chamber 2. The top or cover 23 of the casing 22 carries a depending cylindrical wall 24 which is in spaced relation with the wall 21 and with the wall of the casing 22 so that a tortuous passage is provided for the flow of the water, the water passing from the casing 22 into a ring shaped level controlling chamber 25 through the medium of the flexible connection 26, there being an appropriate number of these connections and they are made flexible because the chamber 25 is vertically adjustable on the depending rods or studs 27 and the chamber 25 is held in its adjustable position by the nuts 28. The purpose of adjusting the chamber 25 is to control the normal water level in the chamber 2 as will be more clearly described hereinafter. Since the water passes through the tortuous passageway, formed by the cylinder 1, the walls 21 and 24 and the outer wall of the casing 22, it will be apparent that the solids or basic settlings will drop into the hopper shaped bottom 29, this bottom being provided with an opening 30 normally closed by a valve 31 on a stem or rock shaft 32, the valve 31 being controlled by suitable mechanism to be hereinafter described.

Immediately below the opening 30 is a basic settlings chamber 33 having a bottom outlet 34 adapted to be closed by a valve 35 on a rocking stem or shaft 36, the valve 35 also being controlled by mechanism to be hereinafter described and being adapted to uncover the bottom outlet 34 so that the basic settlings may pass into the launder or trough 37 through which it may be carried away from the machine. The water which enters the ring shaped chamber 25 may pass out through an over-flow pipe 38 discharging into the launder or trough 37 to wash the basic settlings along the trough and for this purpose the trough 37 will preferably have a slight declination away from the outlet 34.

All of the water delivered into the chamber 25 will not pass out through the pipe 38. Some of it will be used as the motive power for actuating a motor controlling the valves 31 and 35. The motor is supported on the side of the casing 22 by a bracket 39. The motor proper consists of a rocking lever arm 40 pivoted at 41. At one end of the lever arm is a closed tank or receptacle 42 having an inlet pipe 43 at one end connected to the chamber 25 by a flexible connection 44, there being a valve 45 communicating with the chamber 25 so that the effective port area of the passageway from the chamber 25 into the tank 42 may be controlled, thus the rate of flow of the water from the chamber 25 into the tank 42 may be regulated to vary the time required to fill the tank 42. The end of the lever arm 40 opposite to the end carrying the tank 42 is provided with a counter balance weight 46 slidable upon the arm and having its outward movement limited by a head or stop 47. When the tank 42 accumulates a sufficient amount of water it will over balance the counter balance weight 46 and swing from the position shown in Figure 1, downwardly to an arc of about 90° raising the counter balance weight 46 through a similar arc so that the counter balance weight will slide toward the pivot 41. As the tank 42 approximately completes its downward movement, that is just before it reaches the limit of its downward movement, the lug or pin 48, movable in an elongated slot 49 on the end of the rod 50, will strike the bottom of the slot and impart a downward movement of the rod arm 50 depressing the end 51 of the lever 52 to which it is pivoted to overcome the counter balance weight 53 and at the same time depressing the link 54 connected to the crank 55 of the valve stem 36 to overcome the spring 56 to unseat the valve and allow the material from chamber 33 to drop into the trough 37, the valve 31 during this time is closed because the link 54 will pull down on the link 57 to turn the crank 58 of the valve stem 32 against the spring 59, therefore it will be seen that the valve 31 is normally unseated while the valve 35 is normally seated and that when the tank 42 moves downward a sufficient distance the valve 31 will be seated while the valve 35 is unseated and that the valve 31 is seated slightly in advance of the unseating of the valve 35.

Figure 2:
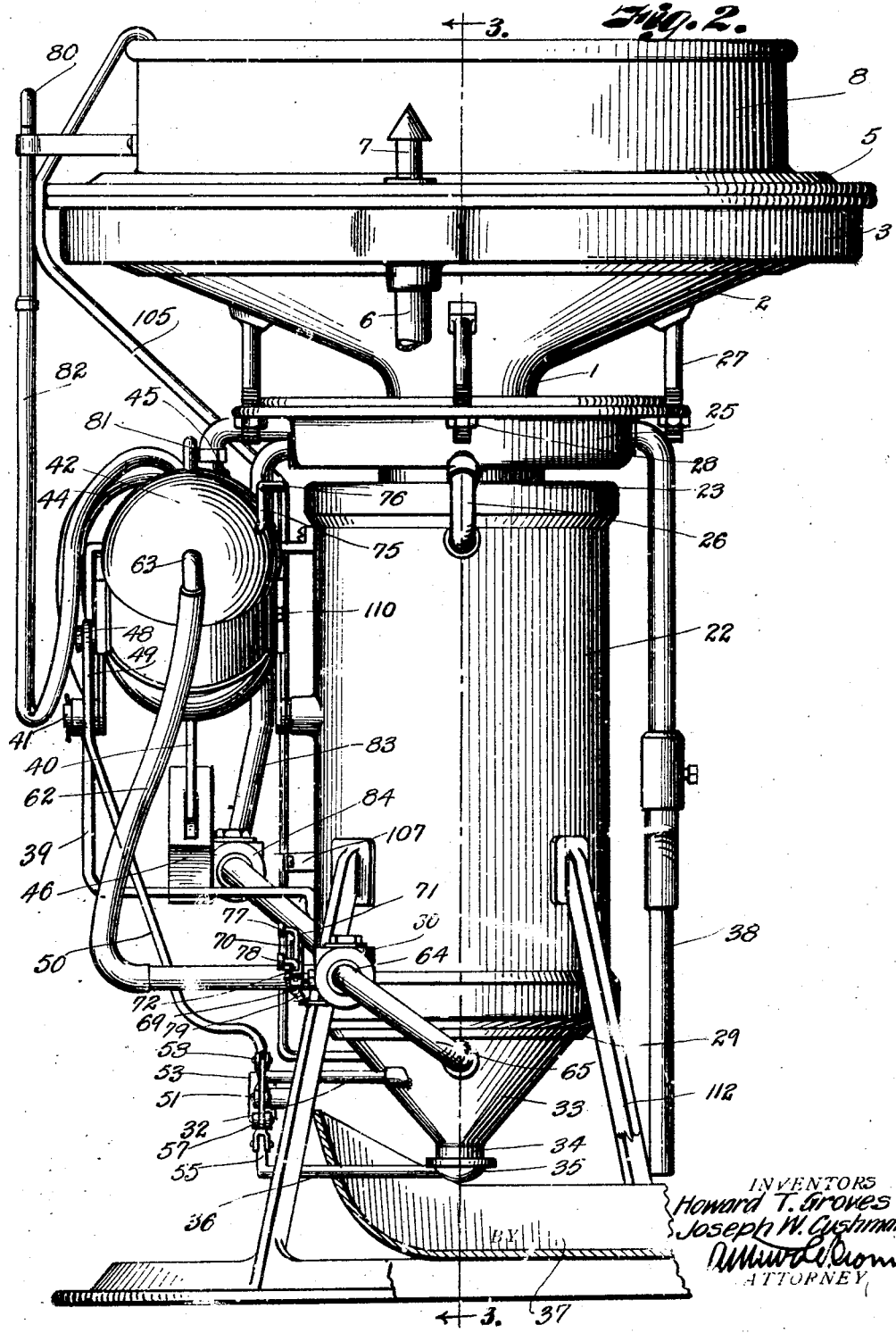
Fig. 2 is a similar view taken at right angles to the view shown in Figure 1.
Figure 3:
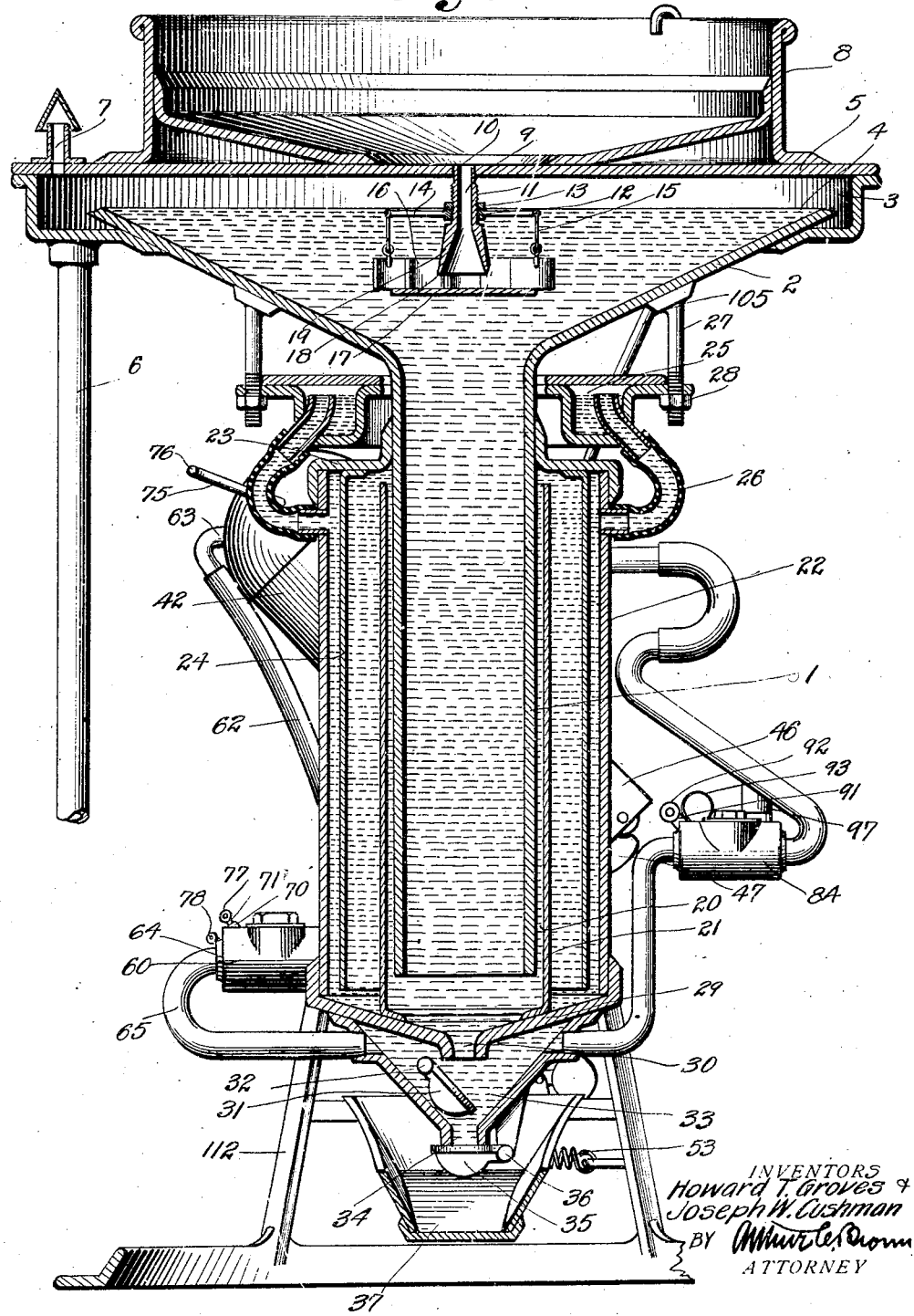
Fig. 3 is a vertical sectional view through the apparatus on line 3:3 of Figure 2.
Figure 4:
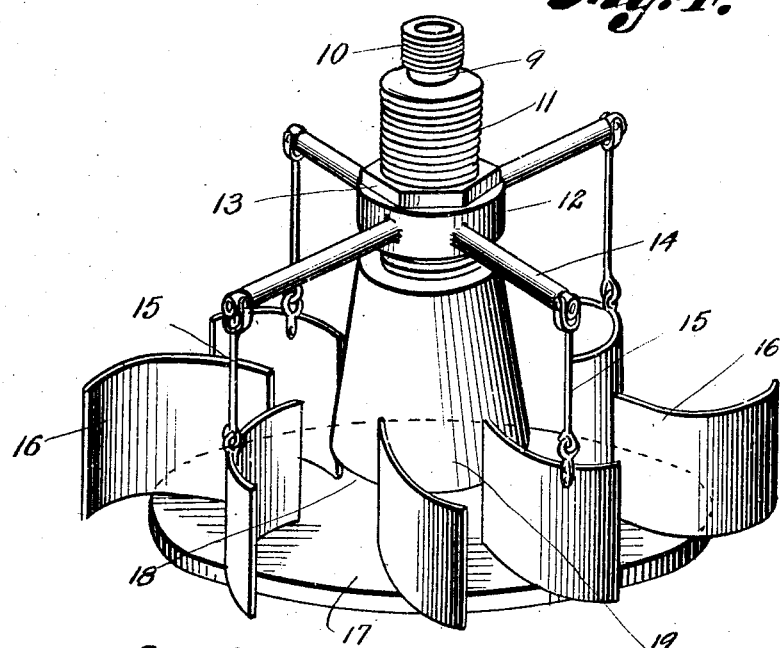
Fig. 4 is an enlarged detail perspective view of the flow controller or governor.
Figure 5:
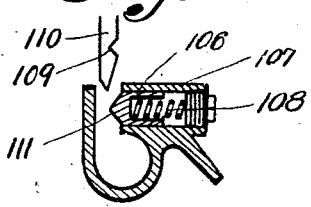
Fig. 5 is a sectional view showing the detent for the water accumulating tank.

When the tank 42 moves downward to its lowermost position to actuate the valve it will be necessary to relieve the accumulated water from the tank 42 in order that the counter balance weight 46 may restore the motor to its original position as shown in Figures 1, 2 and 3. This is accomplished through a valve mechanism shown in Figure 6, the valve mechanism including a casing 60 having an inlet 61 communicating with the flexible tubing 62 connected to tank 42 at 63. The outlet 64 for the casing 60 is connected to the pipe 65 communicating with the bottom settlings chamber 33 so that the water exhausting from the tank 42 may pass through the opening 34 into the trough or launder 37.

Figure 6:
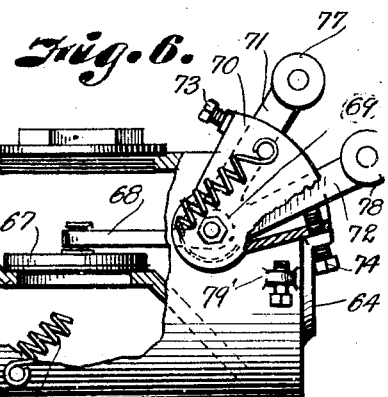
Fig. 6 is an enlarged view, partly in section and partly in elevation, of one of the valve mechanisms.
Figures 7, 8:
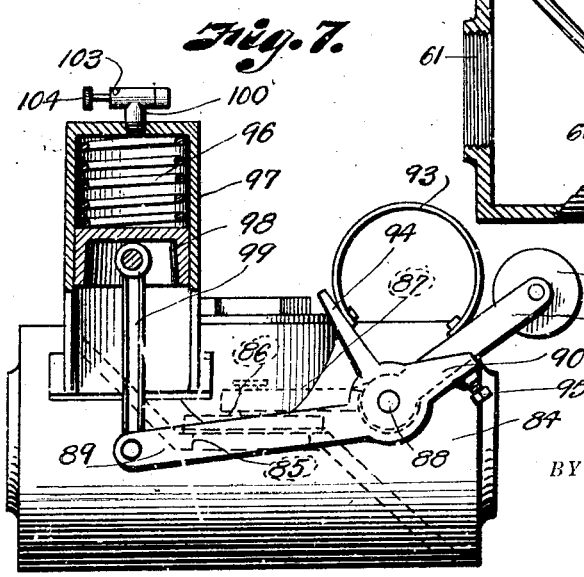
Fig. 7 is a like view of another valve mechanism.
Fig. 8 is a sectional view through the air nipple for the check for the valve mechanism shown in Figure 7.

The valve mechanism in casing 60 is of novel construction and it is operated by the tank 42 when the tank moves to its downward position. Within the casing 60 is a valve seat 66 normally closed by a disk valve 67. The disk valve is carried by an arm 68 on a rock shaft 69 projecting through the casing 60 and carrying the segment 70. The segment is in the form of a hollow arm receiving the two integral arms 71 and 72 loosely mounted about the axis of the shaft 69 and adjustable with the hollow segment 70 through the medium of the set screws 73 and 74 so that proper adjustment of the arms may be made with respect to the projection 75 having a lateral extension 76 adapted to alternately contact with the roller ends 77 and 78 which are on the arms 71 and 72. The segment 70 is normally urged in the position shown in Figure 6 by a tension spring 79, one end of which is fastened to the valve casing 60 and the other end fastened to the segment 70, the spring being off center so that the segment can be tripped either downwardly or upwardly and held in either position by the tension of the spring. In other words, when the right angular valve 76 moves downward with the tank 42 it will describe an arc past the roller 77 but it will contact with the roller 78 swinging the segment 70 downwardly and lifting the valve 76 off its seat, then the water in the tube 62 will flow out through the valve casing 60, through pipe 65 into the basic settlings chamber 33. During this time the valve 31 will be closed and the valve 35 will be unseated. When the valve 67 is unseated and the water flows from the pipe or tube 62, the tube will syphon water from the tank 42 so that the tank will lose its accumulated weight permitting the counter balance weight 46 to over balance it and restore it to its original position as shown in Figure 1. When the valve arms 71 and 72 are tripped down-ward the arm 70 will assume a position which will bring it in the path of the upwardly moving projection 76 during the swinging movement of the tank 42, therefore as the tank 42 moves upward the projection 76 will engage projection 77 and swing the trip projection 76 into position as shown in Figure 6, this movement being effective in seating the valve 67. The downward movement of the segment 70 may be limited by a stop 79', also seen in Figure 6.

When the fluid is moving out of the tank 42 in its lowered position, air will be admitted into tank 42 through a vent pipe 80 having a flexible connection with the pipe 81 in tank 42, the flexible connection being indicated at 82, the vent pipe communicating with the tank 42 opposite to inlet pipe 43. Therefore it will be seen that when the water begins to fill the tank 42 again the air in the tank will escape through the vent pipe 80. The counter balanced weighted end of the lever 40 also operates the valve mechanism in a pipe 83 communicating with the basic settlings chamber 33. This mechanism will now be described.

There is a pipe communicating the chamber 25 with the basic settlings chamber 33 and in the path of the pipe is a valve casing 84 having a valve seat 85 on which may be seated a valve 86. The valve 86 is on an arm 87 mounted on the pivot pin or shaft 88 which extends through the casing 84. The extended end of the shaft 88 carries a lever arm 89 having a socket member 90 in which is a loosely connected arm 91 with a roller 92 on its end. The arm 91 is urged in a downwardly direction by a spring 93 one end of which bears against the arm and the other against a stop finger 94 rigidly mounted against the arm 89. There is a stop screw 95 in the socket member 90 to limit the downward movement of the arm 91. Therefore when the arm 91 is moved downward the valve unseats against the action of the spring 96 in the dash-pot or check cylinder 97 because the arm 89 is connected to a piston 98 bearing against the spring by a connecting rod 99. The upper end of the cylinder 97 is provided with a nipple 100 having a port 101 open to atmosphere but normally closed by a spring check valve 102 so that when the piston 98 moves downwardly the check valve will unseat to admit air. Then when the piston moves upwardly it will be opposed by a cushion of compressed air which may exhaust through a check port 103 controlled by a needle valve 104. The valve 86 will unseat only when the arm 91 moves downwardly, which it will do when the counter balance weight overcomes the weight of the tank 42 and strikes the roller 92.

When the counter balance weight moves downwardly the head 47 will contact with the roller 92 and lift the valve 86 off its seat permitting water from the chamber 25 to fill the chamber 33; that is, the water from pipe 83 is admitted to the basic settlings chamber when the valves 35 and 31 are closed and the valve 86 is unseated and by providing the check for the valve 86, it will remain unseated long enough to allow an adequate supply of water to enter the basic settlings chamber 33 to fill it. Then the valve will seat and further passage of water will not be permitted. Since the water will feed into the basic settlings chamber 33 while the valve is closed and before the valve 31 unseats, means must be provided for allowing the escape of air, so we have provided a vent pipe 105 which leads from the basic settlings chamber 33 and discharges approximately at the top of the apparatus.

In order to stabilize the tank 42 when it swings down to its lower position, we provide a detent 106 which consists of a bolt in a guide 107 and urged by a spring 108 to engage at 109 on the member 110. The spring will be strong enough only to hold the tank 42 in position until enough water runs out to permit the counter balance weight 46 to overbalance it and inasmuch as there will be only a semi-positive engagement on account of the blunt end 111 of the detent engaging the notch the tank will be released by the over balance weight. The casing 22 may be supported on a suitable stand or legs indicated at 112.

In starting the apparatus it is first primed by introducing water until the apparatus becomes filled which will be indicated when it overflows through the pipe 38. Then the fluid from the well is introduced into the tank or receptacle 8 and flows into the hopper like chamber 2 through the pipe 9 and as it strikes the valve disk 17 it will be deflected radially toward the perimeter of the chamber 2 and since the oil is lighter than the water it will float to the top, the volume of water being below the oil and any sediment gravitating to the bottom of the cylinder or pipe 1. Since the water can find no exit except through the pipes 26 and the chamber 25 it will overflow through pipe 38, the oil overflowing over the perimeter of 4 of the chamber 2 into pipe 6 and from there to a suitable receptacle or pipe line. As the water flows into the chamber 25 some of it will pass into the tank 42 and as the tank 42 accumulates water its weight increases until it is heavy enough to counter balance the counter balance weight 46, then it will move downward in the direction indicated by the arrow in Figure 1, operating the valve mechanism in the casing 60 as above described and operating the valves 31 and 35. Then as the tank loses its weight, due to the fact that the water flows from it, the counter balance weight will swing it back to position, as shown in Figure 1, and as the lever 41 moves downward the valve mechanism in the casing 84 will be operated. If the fluid flows into the casing too rapidly the vanes or wings 16 will offer sufficient resistance to the radial stream lines to cause links 15 to be deflected from perpendicular, so shortening them that the disk 17 will be moved closer to the conical nozzle 18 thereby restricting the effective port area of the conical nozzle to cut down the velocity of the fluid to that which the apparatus may properly handle. Therefore it will be seen that the device is entirely automatic in its operation after it has once been primed and that oil will be separated from the fluid to flow off through an oil outlet, that water passing through the apparatus will be properly disposed of and that the basic settlings will pass out in the form of refuse.

While we have described in detail the several elements of our invention which are illustrated in the drawings, we do not wish to be limited to the particular construction shown since obviously changes in form, proportion and minor details of construction may be resorted to without departing from the spirit of the invention or sacrificing any of its advantages.

What we claim and desire to secure by Letters-Patent is:—

1. An apparatus for separating materials of different specific gravity comprising an upper chamber having an over-flow for the lightest material, an over-flow chamber for heavier material and a discharge for the heaviest material and a liquid accumulating, weight overbalancing motor for mechanically controlling the last named discharge.

2. An apparatus for separating materials of different specific gravity comprising an upper chamber having an over-flow for the lightest material, an over-flow chamber for heavier material and a discharge for the heaviest material, means for mechanically controlling the last named discharge, said means comprising a liquid accumulating and discharging motor actuated by fluid passing through the apparatus.

3. In an apparatus for separating fluids having different specific gravities, a casing, a chamber carried by the casing into which fluid may be received, a tank above the chamber, a pipe communicating the tank with the chamber, means for valving the pipe in response to flow of fluid through said pipe and off-takes communicating with the chamber and the casing.

4. In an apparatus for separating fluids of different specific gravities, a casing having communicating separation chambers therein, a pipe for feeding the fluid into the apparatus and means for varying the effective port area of the pipe in response to variations of the velocity of the flow of fluid passing through the pipe.

5. In an apparatus for separating fluids of different specific gravities, a casing having communicating separation chambers therein, a pipe for feeding the fluid into the appartus, means for varying the effective port area of the pipe in response to variations of the velocity of the flow of fluid passing through the pipe, said means comprising a disk below the discharge end of the pipe, wings on the disk and links suspending the wings and disk.

6. An apparatus of the class described comprising a casing having separation chambers, a pipe leading into the apparatus through which fluid to be separated is admitted, an adjustable collar on the pipe, radial arms on the collar, links depending from the arms, a disk below the outlet for the pipe carried by the links and means about the pipe for deflecting the links from vertical planes due to the velocity of the fluid discharged from the pipe to move the disk toward the outlet end of the pipe.

7. An apparatus of the class described comprising a casing, an oil chamber communicating with the top of the casing, a water chamber or passageway in the casing, means for discharging solids from the bottom of the casing, means for causing oil to flow from the first named chamber, means for causing water to flow from the second named chamber and means for actuating the means for discharging solids from the bottom of the chamber, said means comprising a liquid accumulating and discharging motor actuated in response to fluid passing from the casing.

8. In an apparatus of the class described, a casing, a central tubular member in the casing having an upstanding outwardly flared end to provide an oil chamber, a plurality of partitions in the casing in staggered relation to the tubular member, an off-take for the oil chamber, means for admitting fluid into the apparatus, an outlet port at the bottom of the casing, and a liquid accumulating and discharging motor for opening and closing the outlet port.

9. In an apparatus of the class described, a casing, a central tubular member in the casing having an upstanding outwardly flared end to provide an oil chamber, a plurality of partitions in the casing in staggered relation to the tubular member, an off-take for the oil chamber, means for admitting fluid into the apparatus, an outlet port at the bottom of the casing, means for opening and closing the outlet port, said means comprising a pivoted arm, a water tank on one end of the arm, a sliding counter-balance weight on the outer end of the arm, and valve mechanism actuated by the water tank when water flowing from the casing into the tank accumulates to overcome the counter-balance weight.

10. In an apparatus of the class described, a casing, a central tubular member in the casing having an upstanding, outwardly flared end to provide an oil chamber, a plurality of partitions in the casing in staggered relation to the tubular member, an off-take for the oil chamber, means for admitting fluid into the apparatus, an outlet port at the bottom of the casing, means for opening and closing the outlet port, said means comprising a pivoted arm, a water tank on one end of the arm, a sliding counter-balance weight on the other end of the arm, a valve mechanism actuated by the water tank when the water flowing from the casing into the tank accumulates to overcome the counter-balance weight, and a valved pipe communicating with the tank, the effective port area of which is controlled by the tank so that when the tank is in one position the water will flow through the pipe from the tank.

11. In an apparatus of the class described, a casing having an outlet at the bottom thereof, a valve for closing the outlet, a chamber below the outlet and valve, a second valve for closing an outlet to the chamber, means for admitting fluid into the casing, a chamber above the casing communicating therewith, the chamber having an over-flow, a ring-shaped chamber between the last named chamber and the casing, a water actuated motor communicating with the ring-shaped chamber and movable in response to water flowing from the ring-shaped chamber, and means operable by the motor controlling said valves.

12. In an apparatus of the class described, a casing having an outlet at the bottom thereof, a valve for said outlet, a chamber below the outlet and valve, a second valve for closing an outlet to the chamber, means for admitting fluid into the casing, a chamber above the casing communicating therewith, the chamber having an over-flow, a ring-shaped chamber between the last named chamber and the casing, a water-actuated motor communicating with the ring-shaped chamber and movable in response to water flowing from the ring-shaped chamber, valve mechanism for the above mentioned valves, means actuated by the motor for actuating the valve mechanism, and means carried by the motor for rendering the motor ineffective during the passage of water from the ring shaped chamber.

13. An apparatus for separating materials of different specific gravity having an overflow for lighter material, a discharge for heavy material, and means for mechanically controlling the discharge for the heavy material comprising a closure member, and means for moving said closure member out of closing position comprising a weighted member and a member for overbalancing the same upon the accumulation of a predetermined quantity of liquid therein.

14. An apparatus for separating materials of different specific gravity, comprising a casing, a chamber in the casing into which the fluid may be received, a tank above the chamber having an outlet in communication therewith, and means for controlling the size of said outlet between the tank and chamber in response to the rate of flow of liquid from said tank to said chamber.

15. An apparatus for separating materials of different specific gravity, comprising an upper chamber having an overflow for the lightest material, an overflow for the heavier material, a discharge for the heaviest material, and means responsive to the rate of flow of liquid through the apparatus for mechanically controlling the discharge.

16. An apparatus for separating fluids of different specific gravity, comprising a casing having communicating separation chambers therein, a pipe for feeding the liquid into the apparatus, and a valve means suspended below the pipe and movable in response to variations of velocity of flow of the fluid passing through the pipe to vary the effective discharge through the pipe.

17. In an apparatus for separating fluids of different specific gravity, a casing, a pipe for feeding fluid into the casing, a collar supported upon the pipe, a disk below the pipe of greater diameter than that of the pipe, and upstanding wings carried by the disk, against which fluid discharged from the pipe will impinge to tend to raise the disk toward the end of the pipe to vary the effective discharge of the fluid at the end of the pipe.

18. In combination, a tank, a pipe discharging into the tank, a disk below the end of the pipe, flexible supporting means for the disk, and radial blades on the disk surrounding the discharge end of the pipe.

In testimony whereof we affix our signatures.

HOWARD T. GROVES.
JOSEPH W. CUSHMAN.

CERTIFICATE OF CORRECTION.

Patent No. 1,633,858.   Granted June 28, 1927, to

HOWARD T. GROVES ET AL.

It is hereby certified that the above numbered patent was erroneously issued to G & C. Oil Separator Corporation, whereas said Letters Patent should have been issued by mesne assignments of one-half to Howard T. Groves and one-half to H. A. Frey, both of Parsons, Kansas, as shown by the records of assignments in this office; and that the said Letters Patent should be read with this correction therein that the same may conform to the record of the case in the Patent Office.

Signed and sealed this 2nd day of August, A. D. 1927.

Seal.

M. J. Moore,
Acting Commissioner of Patents.